United States Patent [19]
Von Spreckelsen

[11] Patent Number: 6,124,860
[45] Date of Patent: Sep. 26, 2000

[54] METHOD AND APPARATUS FOR PRODUCING CIRCULAR DISTRIBUTIONS

[75] Inventor: Meino Von Spreckelsen, Kronshagen, Germany

[73] Assignee: Linotype-Hell AG, Kiel, Germany

[21] Appl. No.: 08/086,825

[22] Filed: Jul. 7, 1993

[30] Foreign Application Priority Data

Jul. 16, 1992 [DE] Germany ............................. 42 23 424

[51] Int. Cl.⁷ ................................................... G06F 15/00
[52] U.S. Cl. ............................................................ 345/431
[58] Field of Search ..................... 395/131, 126, 395/132, 129; 345/431, 426, 432, 429

[56] References Cited

U.S. PATENT DOCUMENTS 5,270,806 12/1993 Venable et al. .......................... 358/500
5,325,471 6/1994 Inoue ....................................... 395/127

*Primary Examiner*—Phu K. Nguyen
*Attorney, Agent, or Firm*—Hill & Simpson

[57] ABSTRACT

A method for producing circular distributions, particularly color distributions on a recording medium, and which is particularly suited for employment in the field of reproduction technology. A center of concentrically arranged distributions is first determined and a spacing from the center as well as an allocated intensity or color value that is employed for recording the distribution are subsequently determined for at least one prescribable picture element on the recording medium. For determining the center-to-center spacing for a picture element, at least the center-to-center spacing of at least one neighboring picture element is evaluated and only linear transformation steps are implemented in the derivation of the center-to-center spacing for the current picture element from the center-to-center spacing of the neighboring picture element. Subsequently, the intensity or color value dependent on center is allocated to the determined center-to-center spacing. An apparatus for the implementation of the method is also provided.

15 Claims, 4 Drawing Sheets

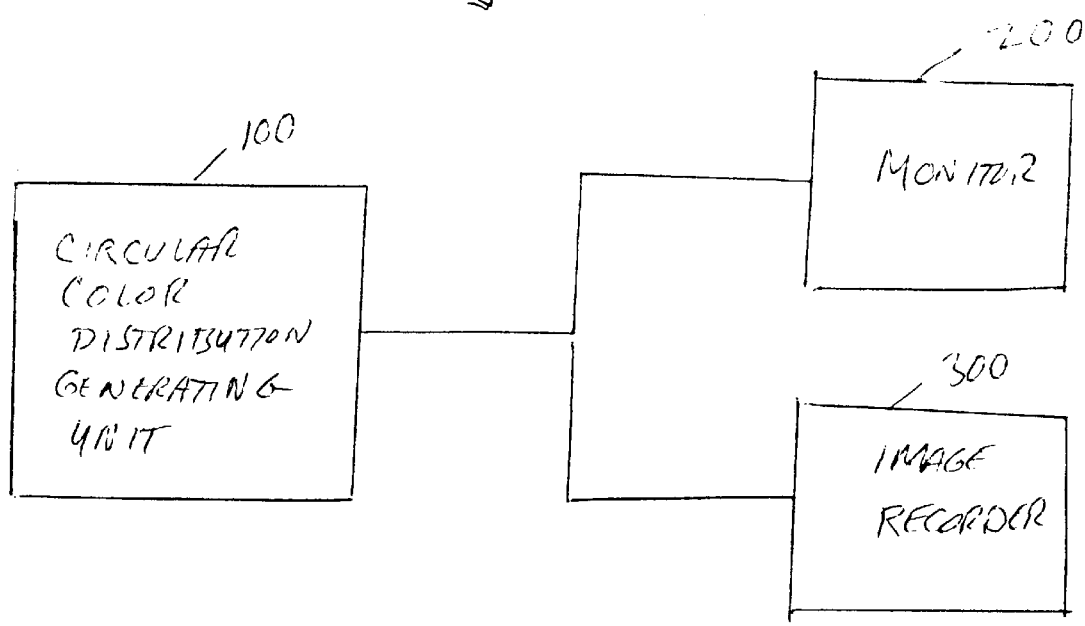

METHOD AND APPARATUS FOR PRODUCING CIRCULAR DISTRIBUTIONS

BACKGROUND OF THE INVENTION

The invention refers to the field of electronic reproduction technology and is directed to a method and an apparatus for producing circular distributions, particularly color distributions, on a recording medium. For example, the recording medium can be the picture screen of a monitor or a recording material (film).

Circular color distributions are gradual changes of density or color values, whereby at least one identical color value is allocated to the picture elements respectively lying on a circular line (level line) arranged concentrically relative to the center or middle. Circular color distributions, for example, are often employed as backgrounds in reproduction technology, with articles being positioned in front of them. The greatest variety of visual effects can be achieved on the basis of the design of the circular color distributions with respect to the position of the centers as well as the color composition. When producing circular color distributions, one usually proceeds for every picture element such that the distance from the center is first identified in a prescribed reference raster and the corresponding color value is subsequently identified, for example via a table allocation. A significant time requirement arises in a calculation of the respective distance values implemented during the production of the color distributions due to calculations of squares and square roots. This has a negative influence on the speed of the generation of the distribution. Thus, conversion methods have become known which shorten the required conversion time. For example, it is possible to respectively calculate the distance values with the assistance of whole-numbered root algorithms without taking the places following the decimal point into consideration. The losses in precision thereby occurring are usually imperceptible, so that no noticeable reduction in the image quality occurs. The execution of such whole-numbered root algorithms is essentially based on whole-numbered divisions and comparison operations. It is also known to utilize the central symmetry of the circle when producing circular color distributions. When, for example, the color values for a sector of 45° are determined first, then the color information for the entire area can be acquired by mirrorings at the diagonals and the principal axes. The whole-numbered root algorithms can also be utilized in the calculation of the color values for the corresponding circular segment.

These known methods, however, have the disadvantage that the color values for a comparatively large area must still be determined with a complicated calculation. When producing circular color distributions on a recording medium that provides an essentially rectangular recording area, symmetry properties can only be meaningfully utilized when the center of the circular color distribution and the center of the corresponding, rectangular recording area respectively coincide. The time savings in the conversion by utilizing symmetry effects become all the less the greater the distance the centers from one another.

Given a center that lies outside the recording area, it is usually no longer possible to save conversion time on the basis of symmetry properties.

The exploitation of mirror symmetries assumes that a plurality of color values are simultaneously available. This, however, is only possible, particularly given color distributions having a fine resolution, when an image store having high storage capacity is available for the color values. This is often not the case.

SUMMARY OF THE INVENTION

It is an object of the present invention to improve a method and an apparatus for generating circular distributions, particularly color distributions such that the production occurs quickly and with little expense.

According to the invention, a method is provided for producing circular color distributions. A center of a concentrically arranged distribution is first determined, and subsequently a distance from the center and an allocated intensity value or at least one color value is determined for at least one prescribable picture element on the recording medium. The determined color value is employed for the point-by-point and line-by-line recording of the distribution on the recording medium. At least one center-to-center spacing r of at least one neighboring picture element is evaluated for the determination of the center-to-center spacing for a picture element. Only linear transformation steps are implemented in the derivation of the center-to-center spacing for the current picture element from the center-to-center spacing of the neighboring picture element. Subsequently, the color value dependent on center is allocated to the determined center-to-center spacing.

According to the invention, the combination of the evaluation of a known center-to-center spacing of a neighboring picture element and a linear transformation makes it possible to calculate the center-to-center spacing for a current picture element in an extremely short time span. This is true since time-consuming arithmetic operations, which can usually be realized only by a multitude of individual transformation steps or iteration sequences, are avoided.

According to a preferred embodiment of the invention, a discrimination is undertaken in the calculation of the geometric locations of the respective picture elements as well as of the allocated center-to-center spacings as to whether the corresponding picture elements within the recording area lie to the left or right of the center of the circular distribution. This discrimination makes it possible to respectively implement simple determination sequences for arbitrary coordinate values that can be realized with a low time consumption.

It is provided in another preferred embodiment that the determination of the respective center-to-center spacings and the allocation of the corresponding color values are implemented line-by-line, and the spacing of a picture element lying at an end of the corresponding line is thereby calculated first and, proceeding from this center-to-center spacing, the spacings of the further picture elements are then determined. A considerable simplification of the calculating rules derives as a result of this line-by-line procedure. This results in both a simple execution of the method as well as in a short time requirement.

According to another preferred embodiment, given spacings of the individual picture elements normed to "1", the center-to-center spacing of a picture element respectively derives from the center-to-center spacing of its neighboring picture element on the basis of an operation with twice a whole-numbered part of the center-to-center spacing of the neighboring picture element plus "1". Elementary operations that are very simple to implement and that make the method steps to be implemented extremely surveyable derive from the utilization of this calculating rule.

BRIEF DESCRIPTION OF THE DRAWINGS

FIG. 1A is a block diagram illustrating presentation of the circular color distribution on a monitor or an image recorder;

DESCRIPTION OF THE PREFERRED EMBODIMENTS

Figure 1:
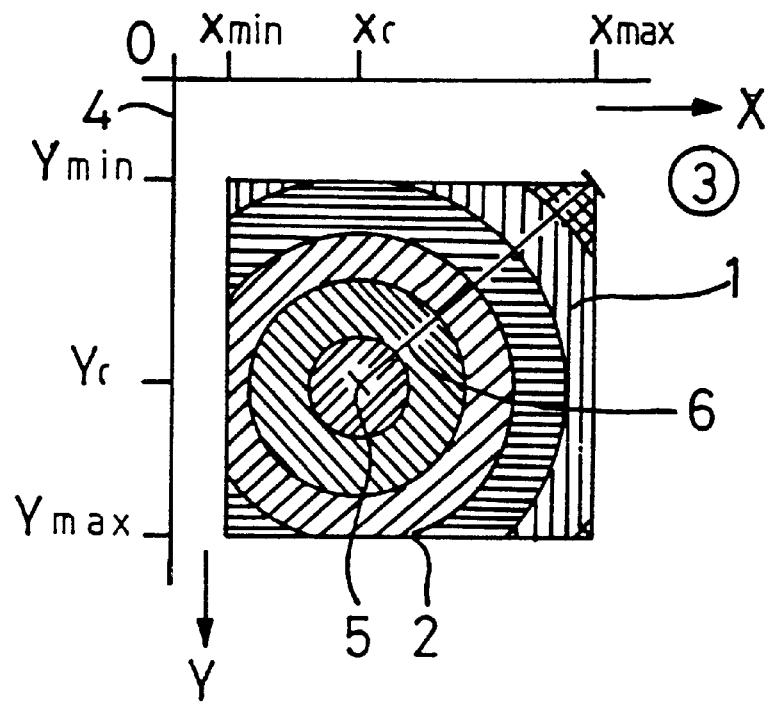
FIG. 1 is a graphic illustration of a circular color distribution.

FIG. 1 generated by a circular color distribution generating unit 100 (shown in greater particularity in FIG. 4), shows a graphic illustration of a circular color distribution 1 within, for example, a rectangular recording area 2 of a recording medium 3. The recording medium 3, for example, can be the picture screen of a monitor 200 or of a recording material recorded by an image recorder 300. The position of the color distribution 1 and of the recording area 2 on the recording medium 3 is defined by coordinate values x, y in a XY coordinate system 4. The recording area 2 is defined by the coordinate values $x_{min}$ and $x_{max}$ in the direction of the X-coordinate axis, and is defined by the coordinate values $y_{min}$ and $y_{max}$ in the direction of the Y-coordinate axis. The center or the middle 5 of the circular color distribution 1 has the coordinate values $x_c$ and $y_c$. A color ray 6, along which an arbitrarily prescribable color composition proceeds, is shown running from the center 5. The center-to-center spacings r of the circular lines can lie between the limit values $r_{min}$ and $r_{max}$, whereby $r_{min}=0$ applies when, as shown, the center 5 lies within the recording area 2.

The circular color distribution 1 is produced pixel-by-pixel and line-by-line, whereby the lines run in the direction of one of the coordinate axes. Every pixel is defined by coordinate values x, y with respect to its position in the XY coordinate system 4, and is defined by at least one color value $C_j$ with respect to its color composition. The color composition in the circular color distribution 1 is characterized as a function of at least one color value $C_j$, dependent on the center-to-center spacing r.

Figure 2:
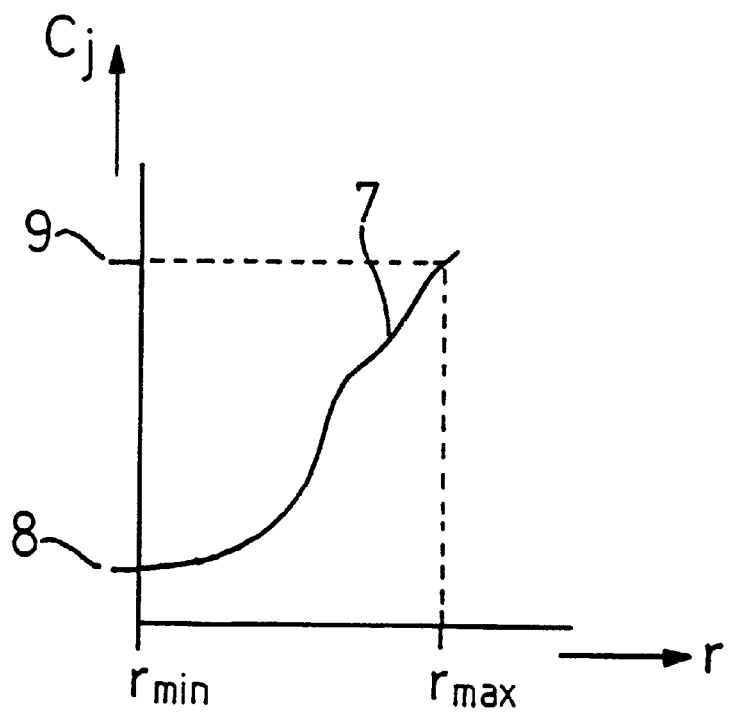
FIG. 2 is a graphic illustration of a color composition within a circular color distribution.

In the graphic illustration, FIG. 2 shows such a color composition 7 for a circular color distribution 1 as a function of at least color value $C_j$ dependent on the center-to-center spacing r within the limit values $r_{min}$ and $r_{max}$.

The color value $C_j$ stands for the color values of an arbitrary color space. Given employment of the printing color space (CMYK color space), the color values $C_j$ (j=0 . . . 3) correspond to the color values C, M, Y and K. Given employment of the RGB color space, the color values $C_j$ (J=0 . . . 2) correspond to the color values R, G and B and, given employment of the HSL color space, they correspond to the color values H, S and L.

In the illustrated example, the color composition 7 proceeds from a minimum color value 8 at the center-to-center spacing $r_{min}$ up to a maximum color value 9 given the center-to-center spacing $r_{max}$. The limit values and the progression or distribution between the limit values can be arbitrarily selected. The color composition 7 or the function $C_j$ (r) is calculated in advance and stored for all whole values r within the recording area 2.

Figure 3:
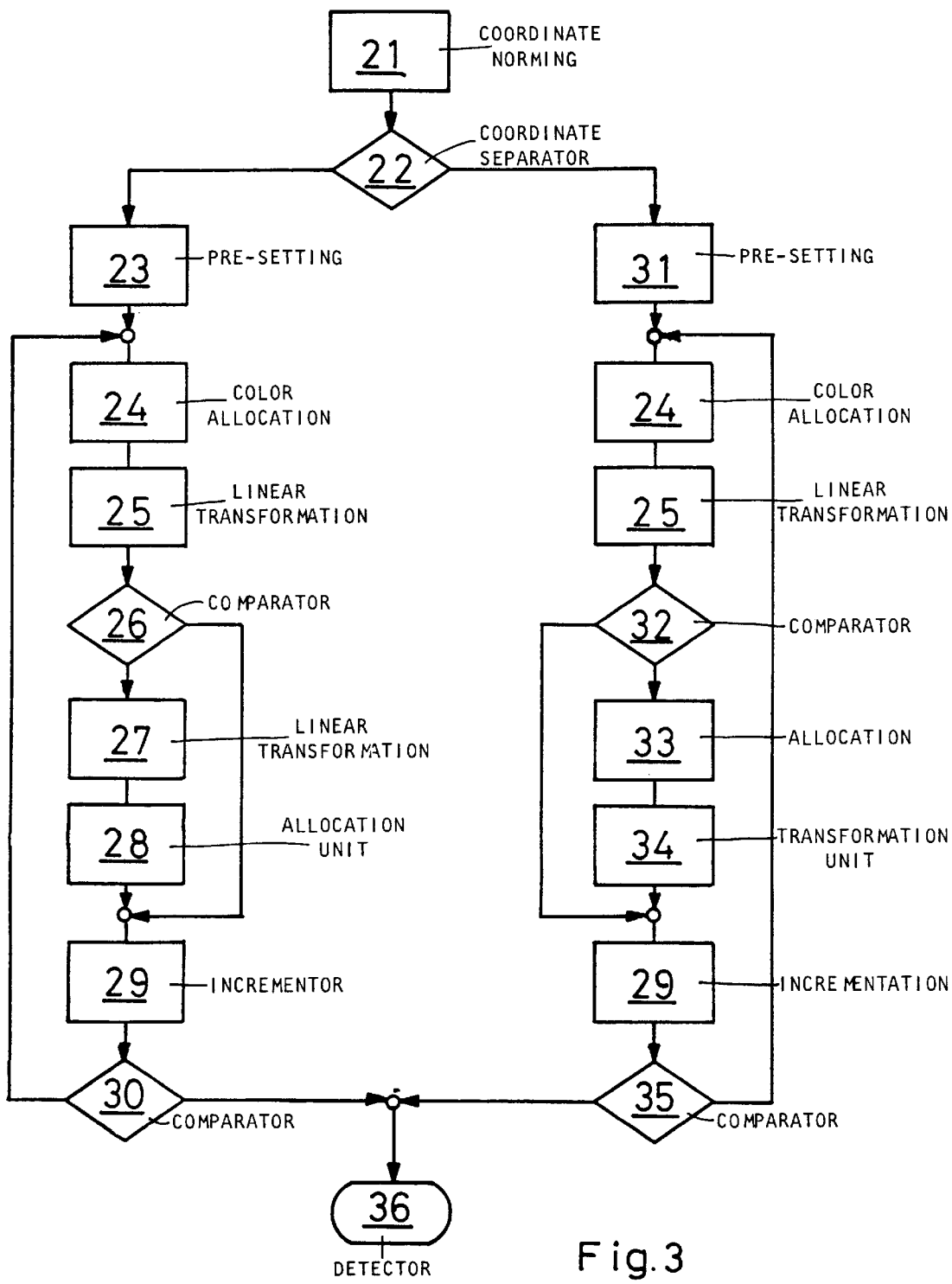
FIG. 3 is a flow chart for illustrating the method sequence.

FIG. 3 shows a flow chart for illustrating the method sequence in the line-by-line calculation of the color values $C_j$ for the picture elements. It is thereby assumed that the lines proceed in the direction of the X-coordinate axis and extend in the direction of the Y-coordinate axis over the range of the values $y_{min}$ and $y_{max}$. The picture elements on the lines are defined by the coordinate values x, y referred to the center 5, whereby the coordinate values y in the direction of the Y-coordinate axis are respectively constant for the picture elements of a line.

A coordinate norming 21 to the center 5 is first implemented for every line of the circular color distribution 1, in that, respectively referred to the center 5, an initial coordinate value $x_a$ and a final coordinate value $x_c$ of the line, which are the boundary values of the recording area 2 in the direction of the x-coordinate axis, are determined as value-wise differences between the coordinate value $x_c$ of the center 5 and the minimum coordinate value $x_{min}$ or, respectively, the maximum coordinate value $x_{max}$. The range for the coordinate values x then lies between the coordinate values $x_a$ and $x_e$. At the same time, a corresponding norming of the coordinate value y is implemented in the direction of the Y-coordinate axis referred to the center 5, in that the initial line values $y_a$ and the final line value $y_e$, which are the boundary values of the recording area 2 in the Y-coordinate direction, are determined, so that the range of the coordinate value y lies between the values $y_a$ and $y_e$. Subsequently, the square of the center-to-center spacing r of the initial picture element of the corresponding line is determined at the start of every line by an addition of the squares of the corresponding coordinate values x, y. The determination of a whole-numbered part of the center-to-center spacing r subsequently occurs on the basis of a whole-numbered root algorithm. A decision as to whether the coordinate values x to be evaluated lie to the left or right of the center 5 is subsequently made with the assistance of a coordinate separator 22. As a further starting condition of a pre-setting 23, the square of the whole-numbered center-to-center spacing r as well as the color values $C_j$ allocated to the whole-numbered center-to-center spacing r are first determined for the coordinate value x to the left of the center 5. Subsequently, the determination of the respective color values $C_j$ occurs for all picture elements within the corresponding line. The color values $C_j$ are thereby first allocated to the current picture element in a color allocation 24. The calculation of the center-to-center spacing r for the next picture element subsequently occurs with the assistance of a linear transformation 27. The determination of the new center-to-center spacing r occurs in that the square of the corresponding new center-to-center spacing r is first determined from the sum of 1) the square of the old center-to-center spacing r, 2) twice the coordinate values x, and 3) "1". A comparator 26 subsequently checks whether the square of the center-to-center spacing newly calculated in this way is smaller than the square of the last, wholenumbered part of the center-to-center spacing. When this is the case, the square of the new, whole-numbered part of the center-to-center spacing is determined from the square of the last whole-numbered part of the center-to-center spacing minus twice the wholenumbered center-to-center spacing r plus "1". Linear transformations are thus also adequate here. The new whole-numbered center-to-center spacing r derives in a simple way by subtracting "1" from the last whole-numbered center-to-center spacing. The transformation of the whole-numbered center-to-center spacing r occurs in a transformation unit 27 and a calculation of new color values $C_j$ which may be required occurs in an allocation unit 28. An incrementation of the coordinate values x by "1" in an incrementor 29 finally occurs both given a positive as well as given a negative comparison result of the comparator 26. Via a comparator 30, a decision is subsequently made as to whether further picture elements are still present to the left of the center 5. When this is the case, the method execution beginning with the color allocation 24 is sequenced again with the new coordinate value x. A detector 36 decides whether the corresponding line has already been ended, or whether values to the right of the center 5 are still to be evaluated. For determining a further line or the as yet outstanding line values, either the entire method sequence is sequenced again, or as warranted, a branch is made into the region of the calculation of the color values $C_j$ for the coordinate values x to the right of the center 5.

The color values $C_j$ for the coordinate values x to the right of the center 5 can be directly determined by the coordinate separator 22. A pre-setting 31 is also present in this branch; deviating from the pre-setting 23; however, the squares of the new, whole-numbered center-to-center spacings r herein are determined by a multiplication of the previous, whole-numbered center-to-center spacings plus "1". The allocation of the color values $C_j$ occurs in the way already set forth. In this method sequence, too, the color allocation 24 as well as the linear transformation 25 are implemented in the way already set forth. Via a comparator 32, an analysis subsequently occurs to see whether the square of the new center-to-center spacing r reaches or exceeds the square of the previous, whole-numbered center-to-center spacing r. When this is the case, the new, whole-numbered center-to-center spacing r is first determined in an allocation 33 by the addition of "1" to the previous, whole-numbered center-to-center spacing r. The square of the new, whole-numbered center-to-center spacing r is subsequently determined in a transformation unit 34 by addition of the square of the previous, whole-numbered center-to-center spacing r plus twice the whole-numbered center-to-center spacing r plus "1". An incrementation 29 is again finally sequenced both given a positive as well as given a negative comparison result of the comparator 32, and a check is carried out via a comparator 35 to see whether the end of the corresponding line has already been reached. When this is the case, the detector 36 decides whether complete color values $C_j$ have already been allocated to the picture elements within the recording area 2.

Figure 4:
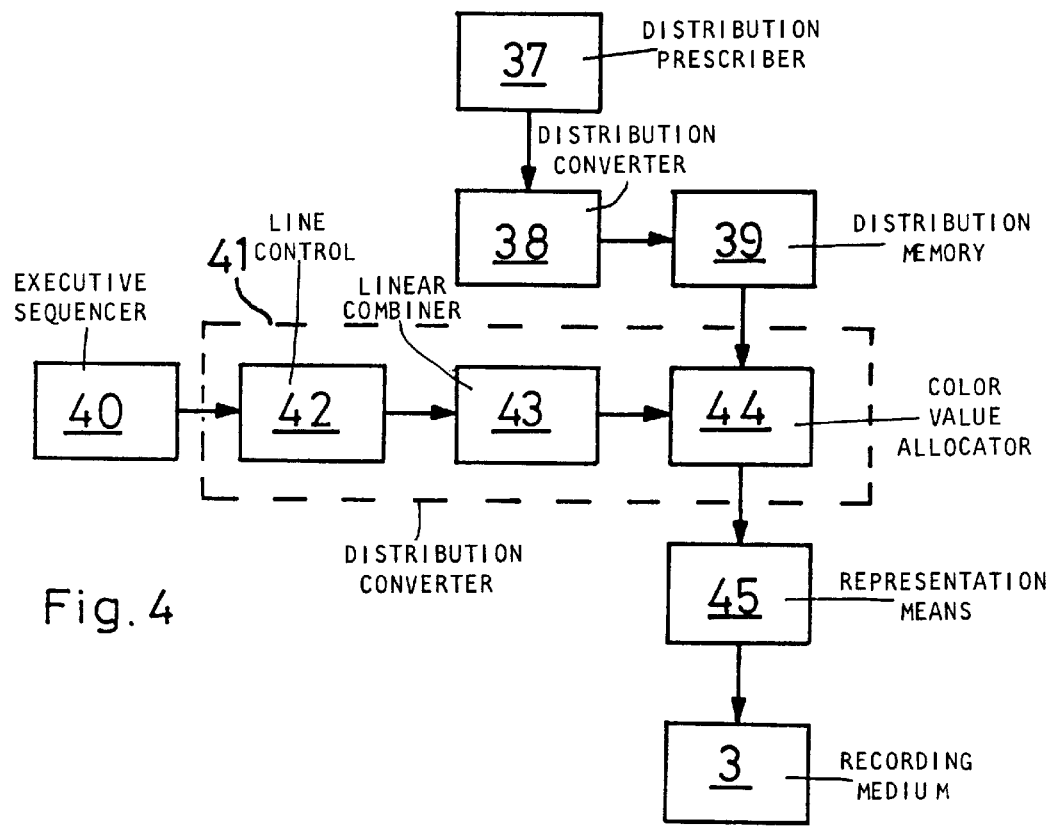
FIG. 4 is a block circuit diagram of an apparatus for producing circular color distributions.

FIG. 4 shows a block circuit diagram of an apparatus for the production of circular color distributions. A distribution prescriber 37 prescribes a circular color distribution 1 to be produced, and feeds a distribution converter 38 that respectively allocates color values $C_j$ to the prescribed circular distribution. In order to reduce the required conversion times, the distribution converter 38 is connected to a distribution memory 39 in which the functions $C_j(r)$ are respectively stored.

An executive sequencer 40 is connected to a distribution converter 41 that is essentially composed of a line control 42 and of a linear combiner 43. The linear combiner 43 is connected to a color value allocator 44 that allocates color values $C_j$ to a respectively determined coordinate pair x, y by reading the distribution memory 39 out. The color values $C_j$ offered by the color value allocator 44 are transmitted onto the recording medium 3 via a representation means 45.

Figure 5:
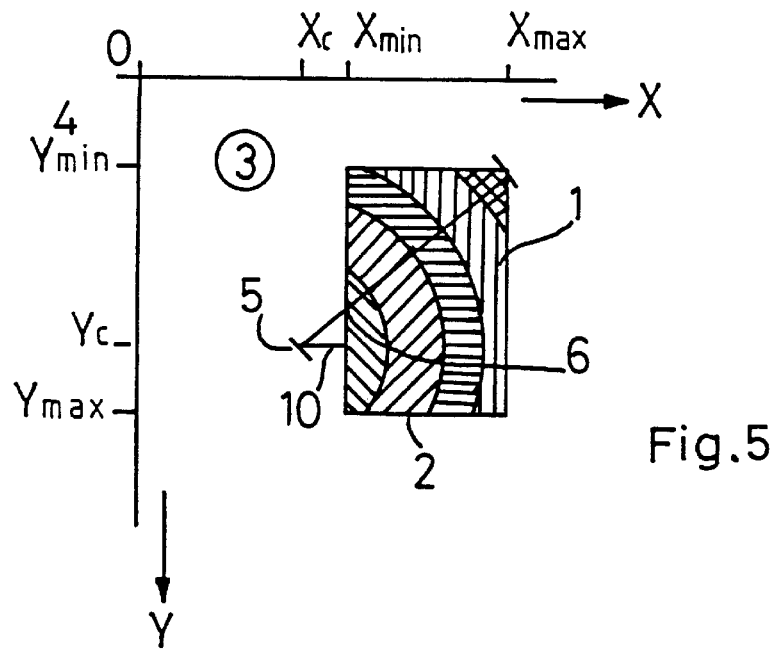
FIG. 5 is a further graphic illustration of a circular color distribution.

FIG. 5 shows a circular distribution 1 wherein the center 5 lies outside the recording area 2. The minimum center-to-center spacing $r_{min}$ of a circular line is indicated by the radius 10.

Although various minor changes and modifications might be suggested by those skilled in the art, it will be understood that I wish to include within the scope of the patent warranted hereon all such changes and modifications as reasonably come within my contribution to the art.

I claim as my invention:

1. A method for producing a circular color distribution on a recording medium, comprising the steps of:
   storing color values as a function of a range of spacings to be used later when determining center-to-center spacings between a center for the circular color distribution and a plurality of picture elements on the recording medium;
   determining said center for said concentrically arranged circular color distribution to be produced;
   determining a center-to-center spacing of a center of a first picture element on a recording medium from the center of the distribution, and assigning a color value for the first picture element that corresponds to said spacing according to said stored function;
   determining a center-to-center spacing for a second picture element which is a neighboring picture element to said first picture element by evaluating said center-to-center spacing of said first picture element and deriving the center-to-center spacing for the second picture element from the center-to-center spacing of said first picture element by using linear transformation steps, and assigning a color value for said second picture element that corresponds to said center-to-center spacing of said second picture element according to said stored function;
   determining additional center-to-center spacings and corresponding color values for additional color picture elements according to said stored function, said additional center-to-center spacings being determined from center-to-center spacings of neighboring picture elements and by use of only linear transformation steps; and
   employing the determined color values for point-by-point and line-by-line recording of the circular color distribution on the recording medium.

2. A method according to claim 1 including the further steps of:
   implementing the determination of the center-to-center spacings as well as the assigning of the respective color values in line-by-line fashion; and
   deriving further center-to-center spacings of further picture elements from the first center-to-center spacing.

3. A method according to claim 1 including the step of implementing a whole-numbered route determination for said determining of the center-to-center spacing of the first picture element.

4. A method according to claim 3 including the step of storing a whole-numbered part of a current center-to-center spacing.

5. A method according to claim 1 including the further steps of:
   selecting a coordinate system that has its coordinate axis extending parallel to a line of picture elements; and
   implementing a norming such that coordinates of the coordinate system are referred to in the center of the circular distribution.

6. A method according to claim 1 including the further step of providing a square of the center-to-center spacing of the second picture element by adding a square of the center-to-center spacing of the neighboring first picture element, twice a value of the coordinate value in a direction of an coordinate axis of a coordinate system, and a value "1".

7. A method according to claim 1 including the further step of determining the respective center-to-center spacings of the picture elements by discrimination between picture elements having coordinate values to a left and picture elements having coordinate values to a right of the center of the circular color distribution to simplify calculations.

8. A method according to claim 1 including the further step of calculating a square of the respective center-to-center spacing, and making a discrimination as to whether the square of the respective center-to-center spacing is smaller than a respective square of a respective whole-number center-to-center spacing.

9. A method according to claim 8 wherein when the square of the respective center-to-center spacing is smaller than the square of the respective whole-number center-to-center spacing, determining a new square of the respective whole-number center-to-center spacing by a subtraction of twice the respective whole-number center-to-center spacing from the square of the center-to-center spacing plus "1".

10. A method according to claim 1 including the further step of calculating a respective center-to-center spacing for a picture element aligned to a right of the center of the circular distribution and checking whether a square of the respective center-to-center spacing reaches or exceeds a square of a respective whole-number center-to-center spacing of the picture element.

11. A method according to claim 1 including the step of providing the recording medium as an image displayed on a monitor.

12. A method according to claim 11 wherein the image displayed on the monitor is said circular color distribution employed as a background with at least one article positioned in front of the background.

13. A method according to claim 1 wherein the recording medium is an output of an image recorder.

14. A method according to claim 13 wherein the output of the image recorder has an image recorded thereon comprising said circular color distribution as a background with at least one article positioned in front of the background.

15. An apparatus for producing a color distribution on a recording medium, comprising:

means for storing color values as a function of a range of spacings to be used later when determining center-to-center spacings between a center for the circular color distribution and a plurality of picture elements on the recording medium;

means for determining said center for said concentrically arranged circular color distribution to be produced;

means for determining a enter-to-center spacing of a center of a first picture element on a recording medium for the center of the distribution, and assigning a color value for the first picture element that corresponds to said spacing according to said stored function;

means for determining a center-to-center spacing for a second picture element which is a neighboring picture element to said first picture element by evaluating said center-to-center spacing of said first picture element and deriving the center-to-center spacing for the second picture element from the center-to-center spacing of said first picture element by using only linear transformation steps, and assigning a color value for said second picture element that corresponds to said center-to-center spacing of said second picture element according to said stored function;

means for determining additional center-to-center spacings and corresponding color values for additional color picture elements according to said stored function, said additional center-to-center spacings being determined from center-to-center spacings of neighboring picture elements; and by use of only linear transformation steps; and means for employing the determined color values for point-by-point and line-by-line recording of the circular color distribution on the recording medium.

* * * * *